US007388927B2

United States Patent
Orlik et al.

(10) Patent No.: US 7,388,927 B2
(45) Date of Patent: Jun. 17, 2008

(54) M-ARY MODULATION OF SIGNALS FOR COHERENT AND DIFFERENTIALLY COHERENT RECEIVERS

(75) Inventors: Philip Orlik, Cambridge, MA (US); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 534 days.

(21) Appl. No.: 11/079,362

(22) Filed: Mar. 14, 2005

(65) Prior Publication Data
US 2006/0203931 A1 Sep. 14, 2006

Related U.S. Application Data

(63) Continuation-in-part of application No. 11/074,168, filed on Mar. 7, 2005.

(51) Int. Cl.
*H04L 27/00* (2006.01)
(52) U.S. Cl. ........................ 375/295; 375/138; 375/308; 375/146; 375/133
(58) Field of Classification Search ................ 375/295, 375/138, 146, 133
See application file for complete search history.

(56) References Cited

U.S. PATENT DOCUMENTS 6,687,293 B1 * 2/2004 Loyer et al. ................ 375/239
7,187,715 B2 * 3/2007 Balachandran et al. ..... 375/242
2001/0053175 A1 * 12/2001 Hoctor et al. ............... 375/130
2003/0108133 A1 * 6/2003 Richards ..................... 375/351
2004/0190596 A1 * 9/2004 Lehmann et al. ........... 375/138
2004/0190641 A1 * 9/2004 Ojard ......................... 375/261
2005/0271120 A1 * 12/2005 Hoctor ....................... 375/138

OTHER PUBLICATIONS

Nakache "Spectral shape of UWB signals—influence of modulation format, multiple access scheme and pulse shape", The 57th IEEE Semiannual Vehicular Technology Conference, 2003. VTC 2003-Spring. vol. 4, Apr. 22-25, 2003 pp. 2510-2514 vol. 4.*

* cited by examiner

*Primary Examiner*—Mohammed Ghayour
*Assistant Examiner*—Juan Alberto Torres
(74) *Attorney, Agent, or Firm*—Dirk Brinkman; Clifton D. Mueller; Gene V. Vinokur

(57) ABSTRACT

A system incorporates time-hopped impulse-radio (TH-IR), transmitted-reference impulse-radio (TR-IR) and noncoherent transceivers in the same wireless network. A transmitter modulates a sequence of bits in a wireless communications network by selecting one coding sequence from a set of orthogonal or quasi-orthogonal coding sequences based on a current subsequence of bits of the input sequence, generating a reference waveform and a data waveform of a waveform pair for each sequence.

14 Claims, 15 Drawing Sheets

200

500

M-ARY MODULATION OF SIGNALS FOR COHERENT AND DIFFERENTIALLY COHERENT RECEIVERS

RELATED APPLICATION

This Application is a Continuation-in-Part of U.S. patent application No. 11/074,168 entitled "Modulating Signals for Coherent and Differentially Coherent Receivers" filed on Mar. 7, 2005 by Orlik et al.

FIELD OF THE INVENTION

The invention relates generally to communication systems, and more particularly to modulation formats used in wireless communication systems.

BACKGROUND OF THE INVENTION

In the United States, the Federal Communications Commission (FCC) allows a restricted unlicensed use of ultra-wide bandwidth (UWB) signals for wireless communication systems, "First Report and Order," Feb. 14, 2002. The UWB signals must be in the frequency range from 3.1 to 10.6 GHz, and have a minimum bandwidth of 500 MHz. The FCC order also limits the power spectral density and peak emissions power of UWB signals, e.g. less than −43.1 dBm/MHz.

One modulation method for UWB uses extremely short time pulses to generate signals with bandwidths greater than 500 MHz, e.g., 1/1,000,000,000 of a second of less, which corresponds to a wavelength of about 300 mm. Systems that use short pulses are commonly referred to as impulse radio (IR) systems.

As shown in FIG. 1A, four different modulation techniques can be used for wireless communication systems, pulse position modulation (PPM) 11, pulse amplitude modulation (PAM) 12, on-off keying (OOK) 13, and bi-phase shift keying (BPSK) 14.

As an advantage, UWB systems can achieve high data rates, and are resistant to multi-path impairments due to the large processing gains. Additionally, the use of IR based UWB technology allows for the implementation of low cost, low duty cycle, low power transceivers that do not require local oscillators for heterodyning. Because UWB radios are primarily digital circuits, they can easily be integrated in a semiconductor chip. In UWB systems, multiple users can simultaneously share the same spectrum with no interference to one another, and the systems are ideal for high-speed home and business networking devices, as well as sensor networks.

In a sensor network, it is desirable to enable the direct communication among multiple inexpensive sensing devices. The IEEE 802.15.4a standard defines a physical-layer for communications with scalable data rates from 1 kbps to 1 Mbps, "IEEE P802.15.4a WPAN Alternate PHY-PAR," 2003, for low power, low data rate network.

Generally, IR systems are either time-hopped (TH-IR), or transmitted-reference (TR-IR). Both systems use sequences of short duration pulses, p(t). However, the modulation and demodulation for TH-IR and TR-IR differ significantly, making TH-IR and TR-IR incompatible in the same network.

TH-IR system are described by M. Win and R. A. Scholtz, "*Ultra-Wide Band Width Time-Hopping Spread-Spectrum Impulse Radio for Wireless Multiple-Access Communications*," in IEEE Trans. On Communications, Vol. 48, No. 4 Apr. 2000, pp. 679-691. In a TH-IR system, each bit or symbol is represented by $N_f$ pulses, where $N_f$ is a positive integer. The time taken to transmit the bit is $T_s$. This is called the symbol duration. The time $T_s$ is further partitioned into frames $T_f$, and the frames are partitioned into chips $T_c$ corresponding typically to a pulse duration. If $N_c$ represents the number of chips in a frame and $N_f$ represents the number of frames in a symbol, then $T_s$, $T_f$ and $T_c$ are related as follows $$T_s = N_f T_f = N_f N_c T_c. \quad (1)$$

FIG. 1B shows the relationship the symbol time $T_s$ 101, the frame time $T_f$ 102, and the chip time $t_c$ 103 for pulses 104 for an example prior art TH-IR waveform 110 for a '0' bit, and a waveform 120 for a '1' bit. Typically, the pulses are spaced pseudo-randomly among the available chips in a frame according to a "time-hopping" code to minimize the effect of multi user interference.

As stated above, the modulation can be binary phase shift keying. With BPSK, each bit b is represented as either a positive or negative one b∈{−1,1}. The transmitted signal has the form $$s(t) = \sum_{i=1}^{\infty} \sum_{j=1}^{N_f} h_{i,j} b_{\lfloor i/N_f \rfloor} p(t - jT_f - c_j T_c), \quad (2)$$

where $c_j$ represents the $j^{th}$ value of the TH code, in the range {0, 1, . . . , $N_c$−1}, and b is the $i^{th}$ modulation symbol. Additionally, an optional sequence denoted as $h_{i,j}$ can be applied to each pulse in the transmitted signal so as to shape the spectrum of the transmitted signal and to reduce spectral lines. The sequence, $h_{i,j}$, is called a polarity scrambling sequence with values of either +1 or −1. Different amplitudes are possible to give further degrees of freedom in the shaping of the spectrum.

FIG. 2 shows a conventional coherent TH-IR receiver 200. The receiver includes an automatic gain control (AGC) unit 210 coupled to an amplifier 220 that is connected to the receive antenna 230. The receiver also includes synchronization 240, timing control 250, channel estimation 260, MMSE equalizer 270, and decoder 280 units. RAKE receiver fingers 290 input to an adder 295. Each RAKE finger includes a pulse sequence generator, correlator and weight combiner. The RAKE fingers reduce multipath interference. Due to the density of the multipaths in UWB signals, the number of required RAKE fingers can be large to obtain reasonable performance. The output of the adder is equalized and decoded. The typical TH-IR receiver has a significant complexity.

TR-IR systems eliminate the need for a RAKE receiver, R. Hoctor and H. Tomlinson, "*Delay-Hopped Transmitted-Reference RF Communications*," IEEE Conference on Ultra Wide Band Width Systems and Technologies, 2002, pp. 265-269." In a TR-IR system, the information is encoded as phase differences of successive pulses in the sequence. Each symbol in a TR-IR system is a sequence of time-hopped 'doublets' or pair of two consecutive pulses. Typically, the first pulse in the pair is referred to as a reference pulse and the second pulse is referred to as a data pulse. The two pulses in each pair are separated by a fixed unit of time $T_d$. Multiple pairs can be transmitted for one information bit. The transmitted waveform has the form $$s(t) = \sum_{i=0}^{\infty} \sum_{j=\frac{iN_f}{2}}^{(i+1)\frac{N_f}{2}-1} h_{i,j}\Big(p(t-2jT_f-c_jT_c) + \qquad (3)$$

$$b_{\lfloor 2j/N_f \rfloor} p(t-2jT_f-c_jT_c-T_d)\Big),$$

where $T_f$, $T_c$, $h_{i,j}$ and $N_f$ are the same as for the TH-IR case.

FIG. 3 shows the relationship the symbol time $T_s$ 301, the frame time $T_f$ 302, and the chip time $T_c$ 303 for pulses 304 for an example TH-IR waveform 310 for a '0' bit, and waveform 320 for a '1' bit.

FIG. 4 shows a conventional TR-IR receiver 400, which is significantly simpler than the TH-IR receiver of FIG. 2. The receiver includes delay 401, multiplier 402, integrator 403, sampler 407 and decision 404 units. The receiver essentially correlates the received signal 405 with a delayed version 406. Obviously, the TR-IR 400 receiver is less complex than the TH-IR receiver 200. However, the reduced complexity is at the cost of requiring twice the number of pulses, and the additional energy required for the reference pulses, nominally 3 dB or more.

It is clear that the decision to use either TH-IR or TR-IR modulation leads to incompatible system structures. Therefore, it is desired to provide a system structure that works with both TH-IR and TR-IR transceivers, to enable cost, complexity and performance trade-offs within a common wireless network.

SUMMARY OF THE INVENTION

The invention provides a system and method for incorporating TH-IR and TR-IR transceivers in the same wireless network. The invention also provides a modulation format that encodes information bits is such a way to enable both TH-IR and TR-IR receivers to demodulate the same signals. In addition, the modulation format does not suffer from the inherent 3 dB loss when the TH-IR receiver is used. The invention can be applied to narrow band, wide band, and ultra-wide band radio systems.

More specifically, a method modulates a sequence of bits in a wireless communications network by generating a reference waveform, e.g., a pulse, and a data waveform, e.g., another pulse, of a waveform pair for each current bit. The phase of the reference waveform depends on a previously modulated bit, and a difference in phase (polarity) between the reference waveform and the data waveform pair depend on the current bit.

A symbol period for the current bit is partitioned into multiple time intervals, and the reference waveform and the data waveform are encoded in a selected one of the time intervals that depends on the current bit.

The invention can also use orthogonal or quasi-orthogonal coding sequences to encode a subsequence of the information bits in both the phase difference of the reference and data pulses. In this case, the individual polarities of the pulses constitute a symbol. In this format, different coding sequences signify different data symbols.

DETAILED DESCRIPTION OF THE PREFERRED EMBODIMENT

Our invention provides a system and method that enables both TH-IR and TR-IR transceivers to co-exist in the same wireless network. Our idea is based on our observation that TR-IR systems encode an information bit as a phase difference between a reference pulse and a data pulse. Furthermore, the polarity of the reference pulse is inconsequential for the correct operation of the TR-IR system.

Therefore, we encode redundant information in the reference pulses so that a TH-IR receiver can decode the information with improved performance, while maintaining the required phase difference or polarity so that a TR-IR can also decode the information. We call this modulation 'hybrid-IR' (H-IR).

Figure 5:
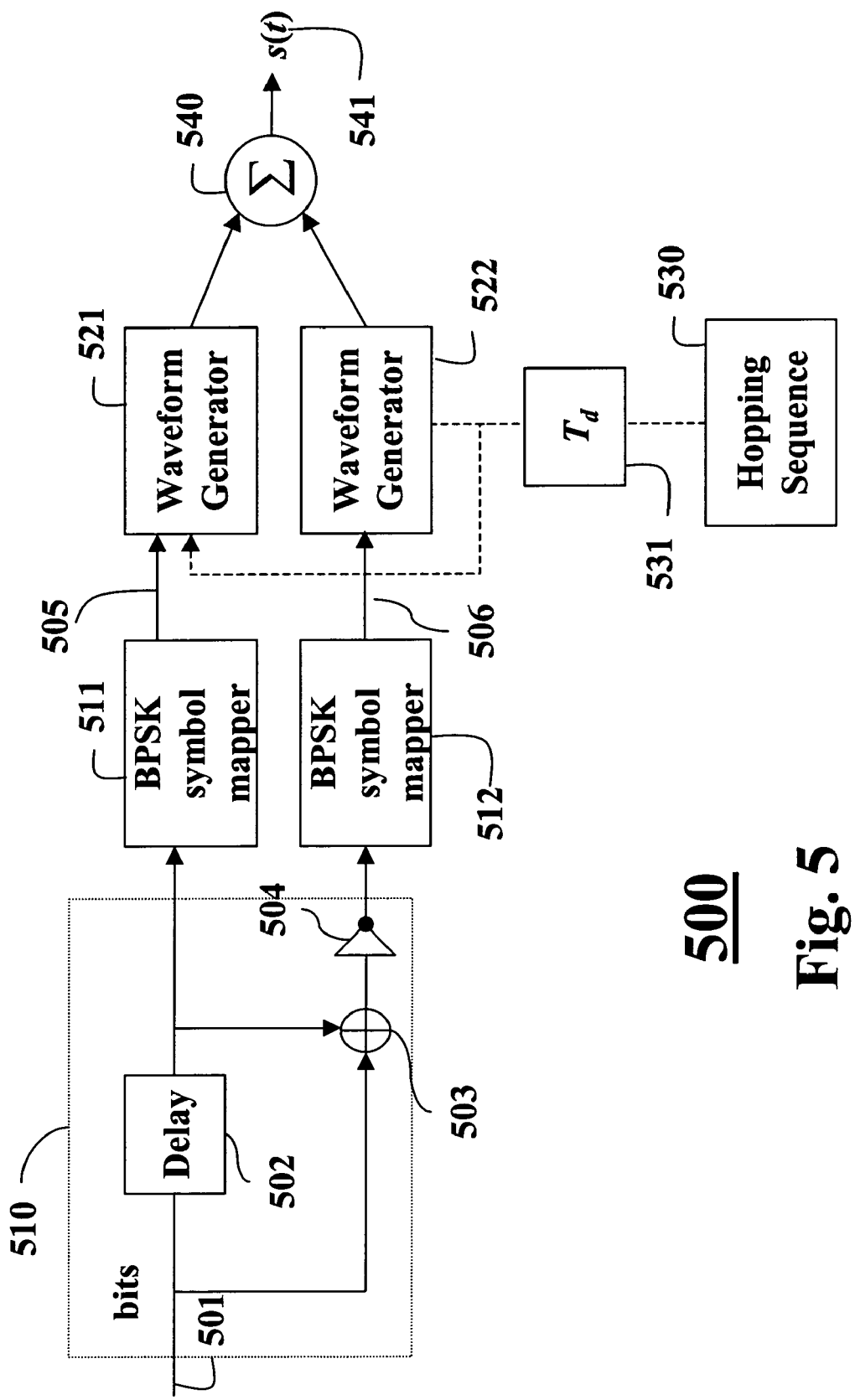
FIG. 5 is a block diagram of a hybrid-IR transmitter according to the invention.

FIG. 5 show a H-IR transmitter 500 according to the invention. The transmitter includes a pre-processor 510 for input bits 501. The pre-processor includes a delay 502 and an adder 503. The adder sums each input bit 501 to a delayed version of the bit and the sum is inverted 504.

The pre-processing generates a pair of modulating bits from two successive information bits. It should be noted that more than one pair of modulation bits can be used for each information bit. During each symbol period, the symbols are modulated 511-512. Reference waveforms, e.g., pulses 505, in the sequence are BPSK modulated 511 according to the input bits 501, and data waveforms, e.g., pulses 506, are BSPK modulated according to the inverted sum. Waveform generators 521-522 are applied, according to a hopping sequence 530 and delay $T_d$ 531 and the results are combined 540.

The transmitted signal, s(t) 541, can be expressed as $$s(t) = \sum_{i=0}^{\infty} \sum_{j=\frac{iN_f}{2}}^{(i+1)\frac{N_f}{2}-1} b_{\lfloor 2j/N_f \rfloor -1} p(t-2jT_f-c_jT_c) + \qquad (4)$$

$$(b_{\lfloor 2j/N_f \rfloor-1} \oplus b_{\lfloor 2j/N_f \rfloor})p(t-2jT_f-c_jT_c-T_d).$$

The modulation according to Equation (4) shows that a phase difference between the reference pulse and data pulse is identical to a conventional TR-IR system. Table A shows the four possible combinations of a previous and a current bit, the corresponding values of the reference and data waveforms, and their phase differences or polarities.

TABLE A

| Previous bit | Current bit | Reference pulse modulation symbol $b_{\lfloor 2j/N_f \rfloor-1}$ | Data pulse modulation symbol $b_{\lfloor 2j/N_f \rfloor-1} \oplus b_{\lfloor 2j/N_f \rfloor}$ | Phase difference between reference pulse and data pulse |
| --- | --- | --- | --- | --- |
| 0 | 0 | −1 | 1 | 180° |
| 0 | 1 | −1 | −1 | 0° |
| 1 | 0 | 1 | −1 | 180° |
| 1 | 1 | 1 | 1 | 0° |

If the current bit is 0, then the phase difference between the reference pulse and the data pulse is always 180° regardless of the value of the previous bit. If the current bit is 1, then the phase difference is 0°.

It should be clear that a TR-IR receiver can demodulate the signal according to the invention. However, the signal can also be demodulated by a TH-IR receiver with improved performance. The gain in performance is based on the fact that information is encoded in both the reference pulses and the data pulses. Thus, the TH-IR receiver can use the energy in the reference pulses to make decisions on the values of the transmitted bits, see Table A. During each symbol period, a sequence of $N_f/2$ pairs is transmitted. The pair in each frame is described as a sequence of pulses, each with a polarity of the pulses depending on the current and previous bit that are transmitted. There are four possible combinations of pairs.

$$s_0(t) = -1 * \frac{1}{\sqrt{N_f E_p}} p(t) + 1 * \frac{1}{\sqrt{N_f E_p}} p(t-T_d) \qquad (5)$$

$$s_1(t) = -1 * \frac{1}{\sqrt{N_f E_p}} p(t) - 1 * \frac{1}{\sqrt{N_f E_p}} p(t-T_d)$$

$$s_2(t) = 1 * \frac{1}{\sqrt{N_f E_p}} p(t) - 1 * \frac{1}{\sqrt{N_f E_p}} p(t-T_d)$$

$$s_3(t) = 1 * \frac{1}{\sqrt{N_f E_p}} p(t) + 1 * \frac{1}{\sqrt{N_f E_p}} p(t-T_d)$$

The coefficient $1/\sqrt{N_f E_p}$ in the equations normalizes the transmitted symbol to unit energy, where $E_p$ is the energy of the pulse, and $N_f$ is the number of pulses in a symbol. Note that this set of four signals can be described with two orthogonal basis functions $\Psi_0$ and $\Psi_1$. We select:

$$\psi_0(t) = \frac{1}{\sqrt{N_f E_p}} p(t) \text{ and} \qquad (6)$$

$$\psi_1(t) = \frac{1}{\sqrt{N_f E_p}} p(t-T_d)$$

as the basis functions. Then, we can express the four possible pairs as:

$$s_0(t) = -1 * \psi_0(t) + 1 * \psi_1(t),$$

$$s_1(t) = -1 * \psi_0(t) - 1 * \psi_1(t),$$

$$s_2(t) = 1 * \psi_0(t) - 1 * \psi_1(t), \text{ and}$$

$$s_3(t) = 1 * \psi_0(t) + 1 * \psi_1(t). \qquad (7)$$

We can also represent the signals as a vector

Therefore, the transmitted signal can be described as follows. During each symbol period, the transmitter transmits a sequence of $N_f/2$ pairs. The four possible pairs are given by Equation (7). The pairs are optionally time hopped and scrambled with a polarity code.

As an advantage, the invention provides a modulation format with 'memory'. By memory, we mean that the encoding of each bit includes information about previously encoded bits. Modulation formats that have memory can be represented by a trellis diagram, and decoded accordingly with a Viterbi decoder. Additionally, the transmitted signal is now a two-dimensional signal because two basis signals $\psi_0(t)$ and $\psi_1(t)$ are used to represent the pair of signals.

Figure 6:
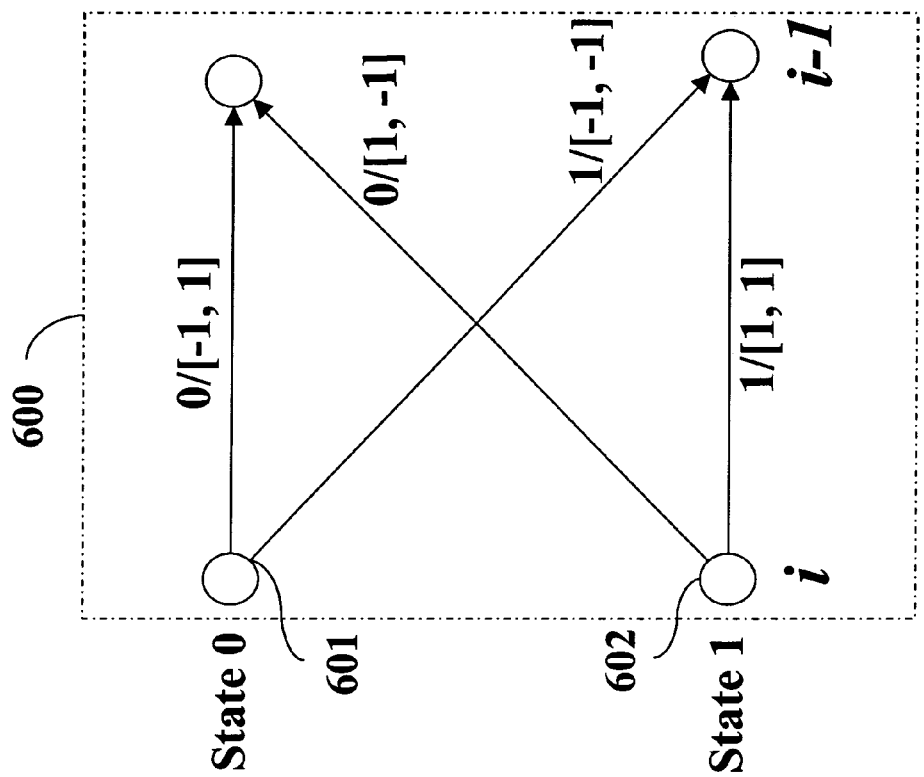
FIG. 6 is a trellis diagram of a Viterbi decoder according to the invention.

FIG. 6 shows a diagram 600 for a Viterbi decoder using a trellis. The trellis has two states, where a state 0 601 is a value of a previous 0 bit, and state 1 602 is a value of a previous 1 bit. Branches of the trellis indicate possible transitions. The branches are labeled with the value of the current bit and the vector representation of the transmitted pair. For example, if the current state is 0 and a '1' bit is to be transmitted, then a transition to state 1 occurs, and pair $s_1$=—1, —1 is transmitted.

With this interpretation of the hybrid-IR modulation, we see that a coherent TH-IR receiver can be used to demodulate the signal. Our TH-IR receiver is adapted to accommodate the two-dimensional description of the symbol waveform and the memory between consecutive symbols according to the invention.

Figure 7:
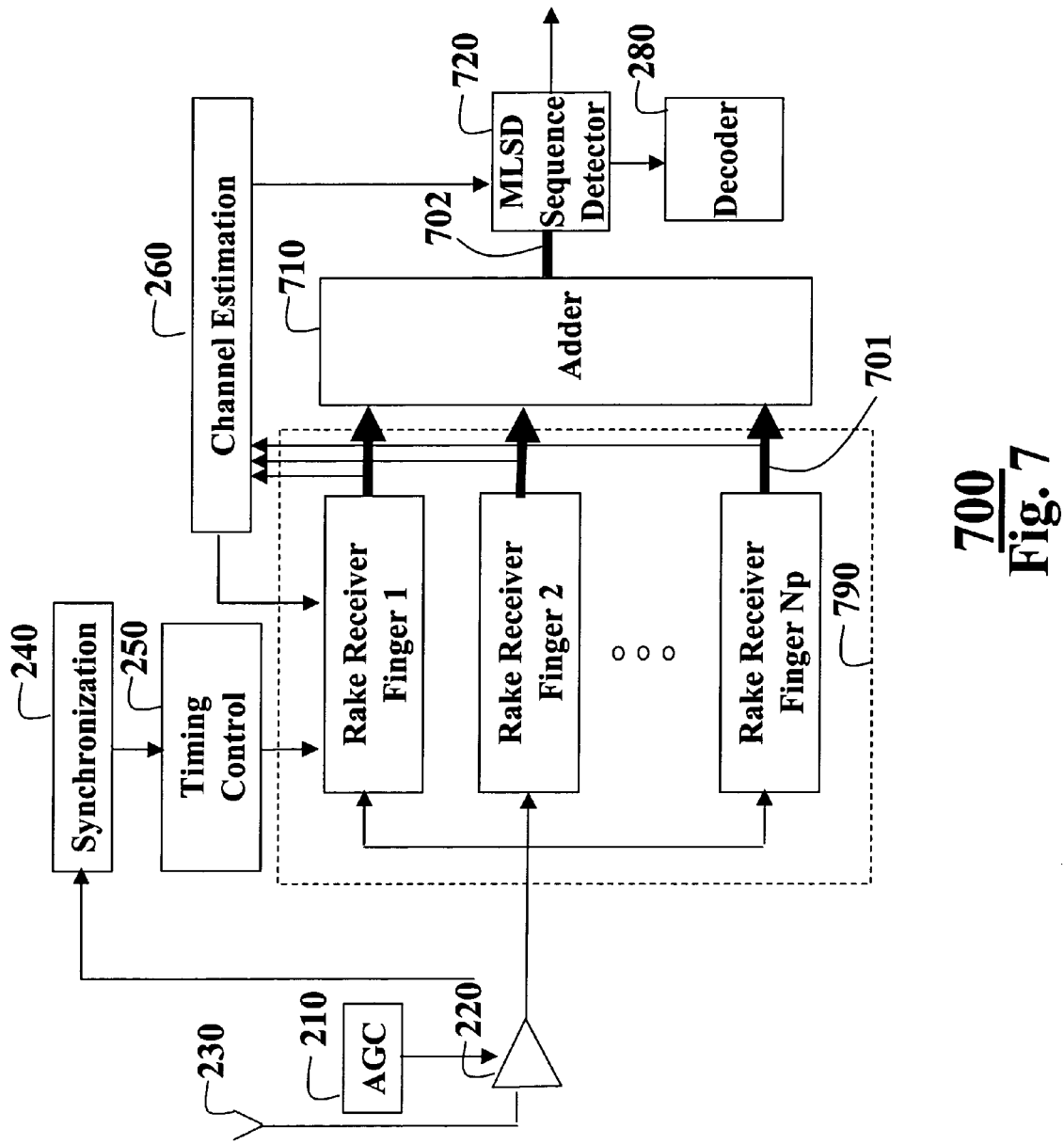
FIG. 7 is a block diagram of a hybrid-IR receiver according to the invention.

FIG. 7 shows the TH-IR receiver 700 according to the invention. As before, we use a RAKE structure 790. However, now the RAKE fingers correlate the incoming signal with sequences of the two basis pulses, $\psi_0(t)$ and $\psi_1(t)$. The output of each finger is now a 2-D vector 701. The outputs of the finger are summed 710 to produce soft input observations 702 for a conventional maximum likelihood sequence detector (MLSD) 720. The MLSD detector determines a most probable path through the trellis 600 for a given sequence of observations 702. Methods that approximate the MLSD detector, such as Viterbi decoding can also be used.

Figure 8:
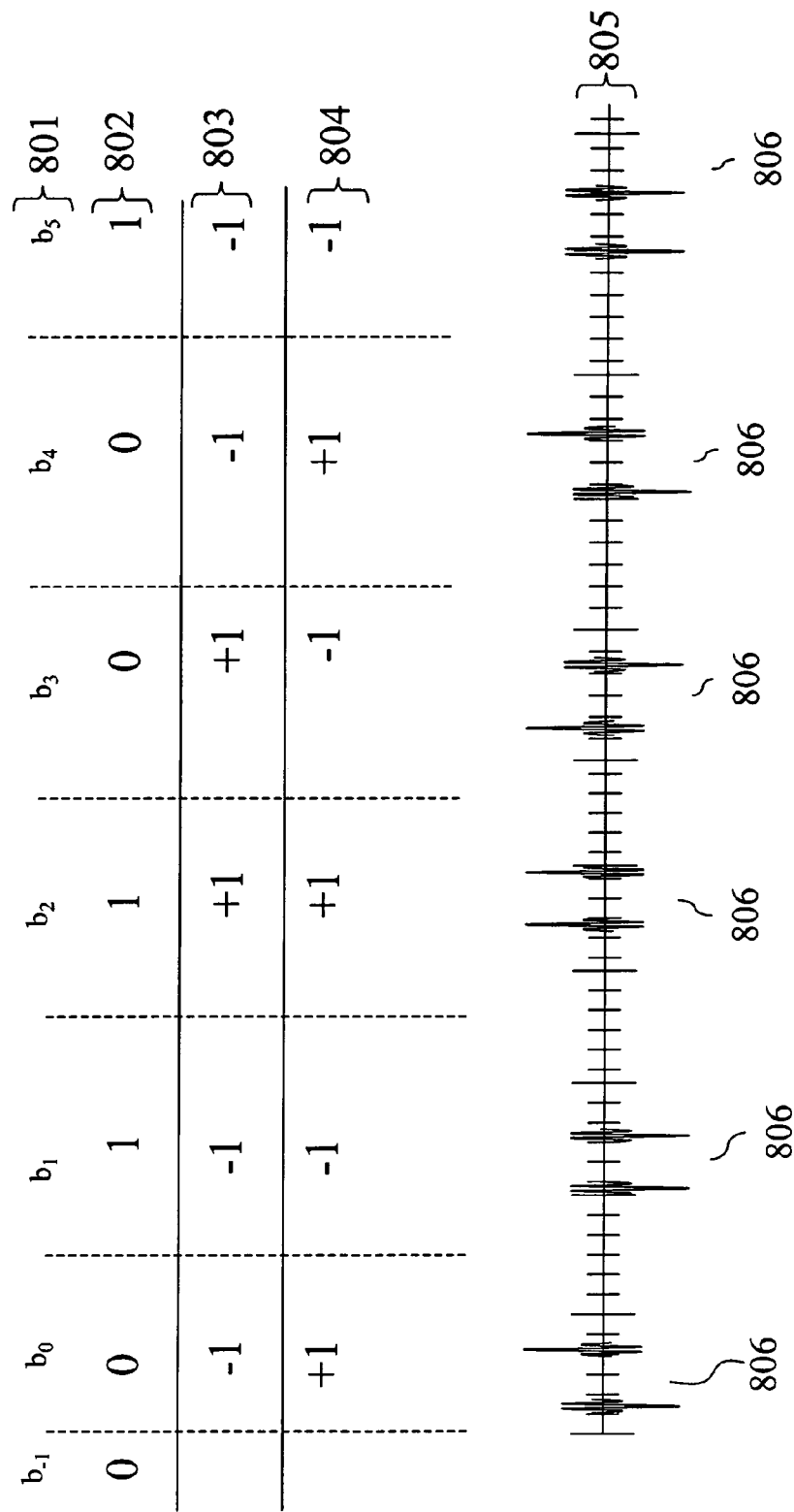
FIG. 8 is a diagram of hybrid-IR modulation according to the invention.

FIG. 8 shows the relationship between symbols, bits and modulated waveforms. The six symbols of the sequence 801 to be modulated are labeled $b_0$ to $b_5$, with a previous encoded symbol '0'. The symbols in the example sequence are {0, 1, 1, 0, 0, 1} 802, which correspond to reference bits

{−1, −1, +1, +1, −1, −1} 803, and data bits

{+1, −1, +1, −1, +1, −1} 804, and a waveform 805 with reference and data pulse pairs 806, where a "down" pulse encodes '−1' and an 'up' pulse encodes '+1'.

From FIG. 8, we see that the waveform 805 has the properties described earlier. Specifically, the phase difference between the reference pulse and the data pulse in each pair 806 contains the information about the current bit being transmitted. For each pair the phase difference is 180° when a '0' bit is transmitted, and a 0° phase difference when a '1' bit is transmitted.

Additionally, the sequence of pairs also contains the information about the previous bit in the polarity of the reference pulse. Again, this is seen in FIG. 8, where the reference pulse in each pair has a +/− polarity that indicates the value of the previously encoded bit. That is, a positive polarity if the previous bit was a '1', and a negative polarity when the previous bit was a '0'. It should be understood, that the polarities can all be reversed to achieve the same result.

Figure 1A:
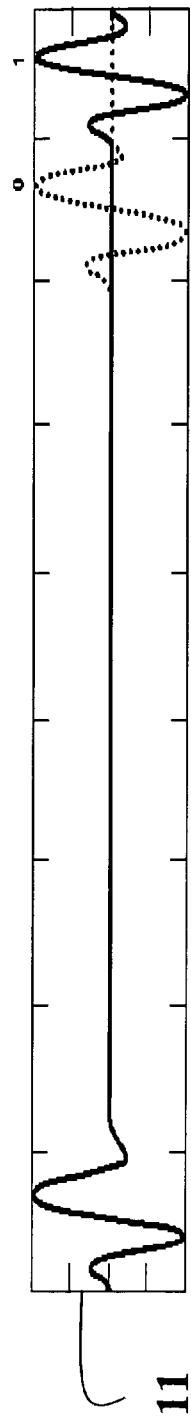
FIG. 1A is a timing diagram of prior art modulation techniques.
Figure 1A:
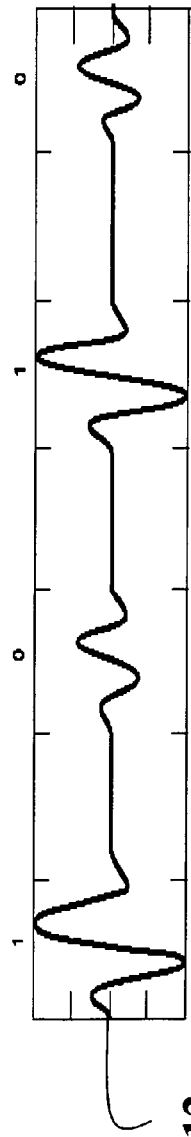
Figure 1A:
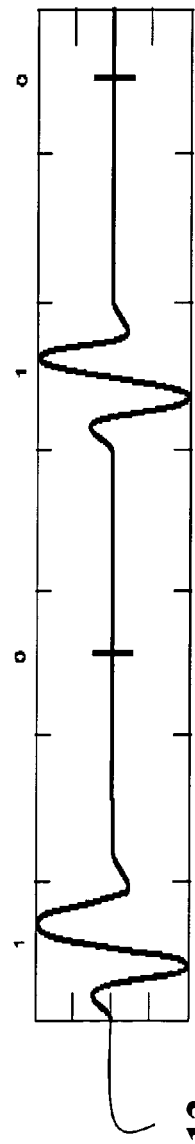
Figure 1A:
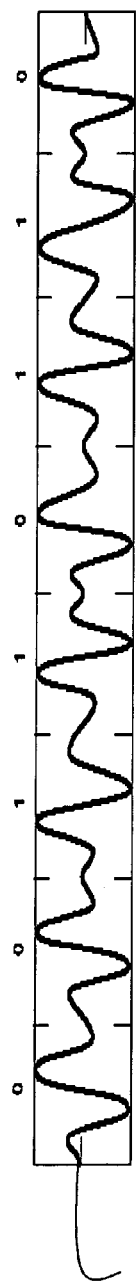
Figure 1B:
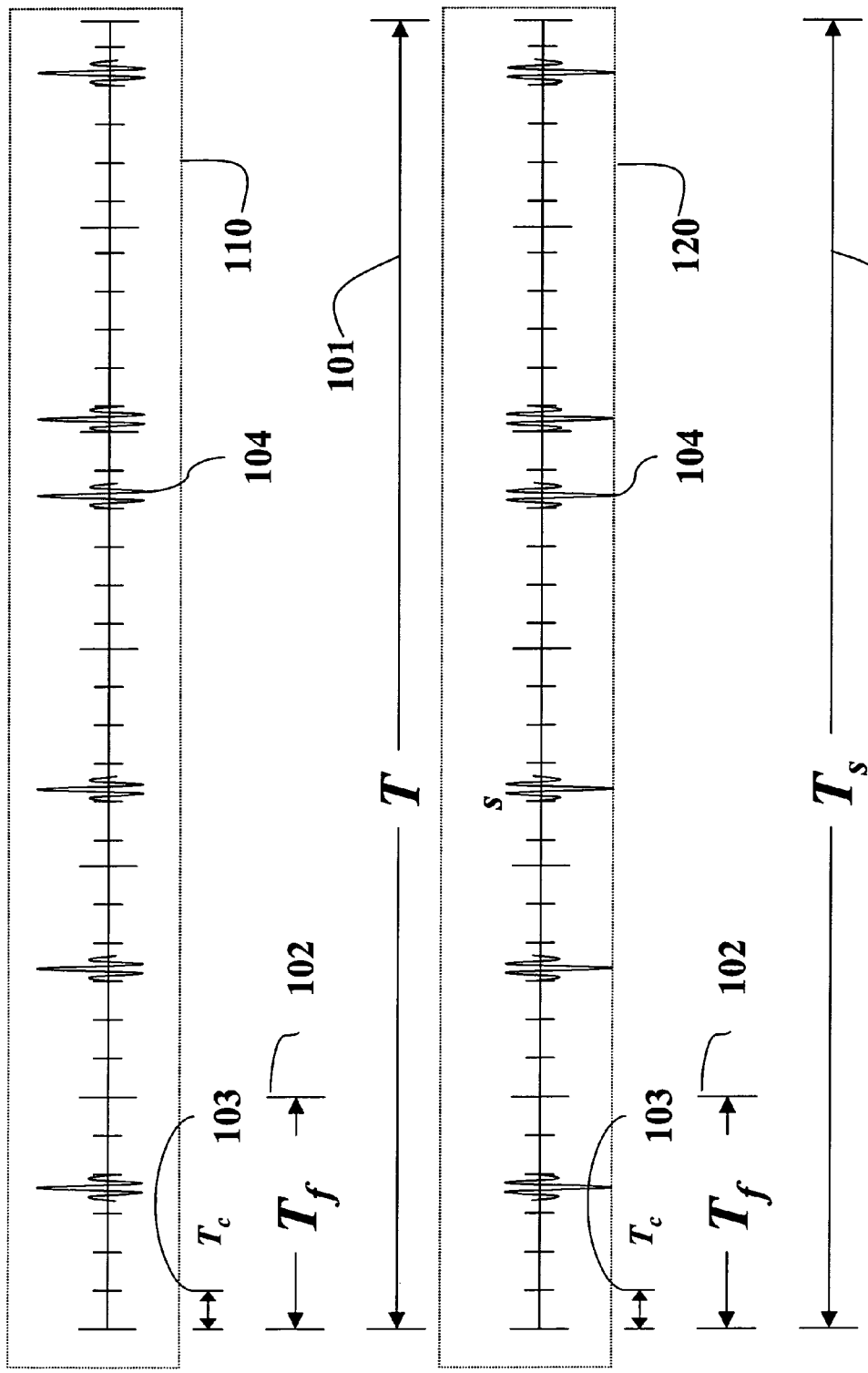
FIG. 1B is a timing diagram of prior art TH-IR modulation.
Figure 2:
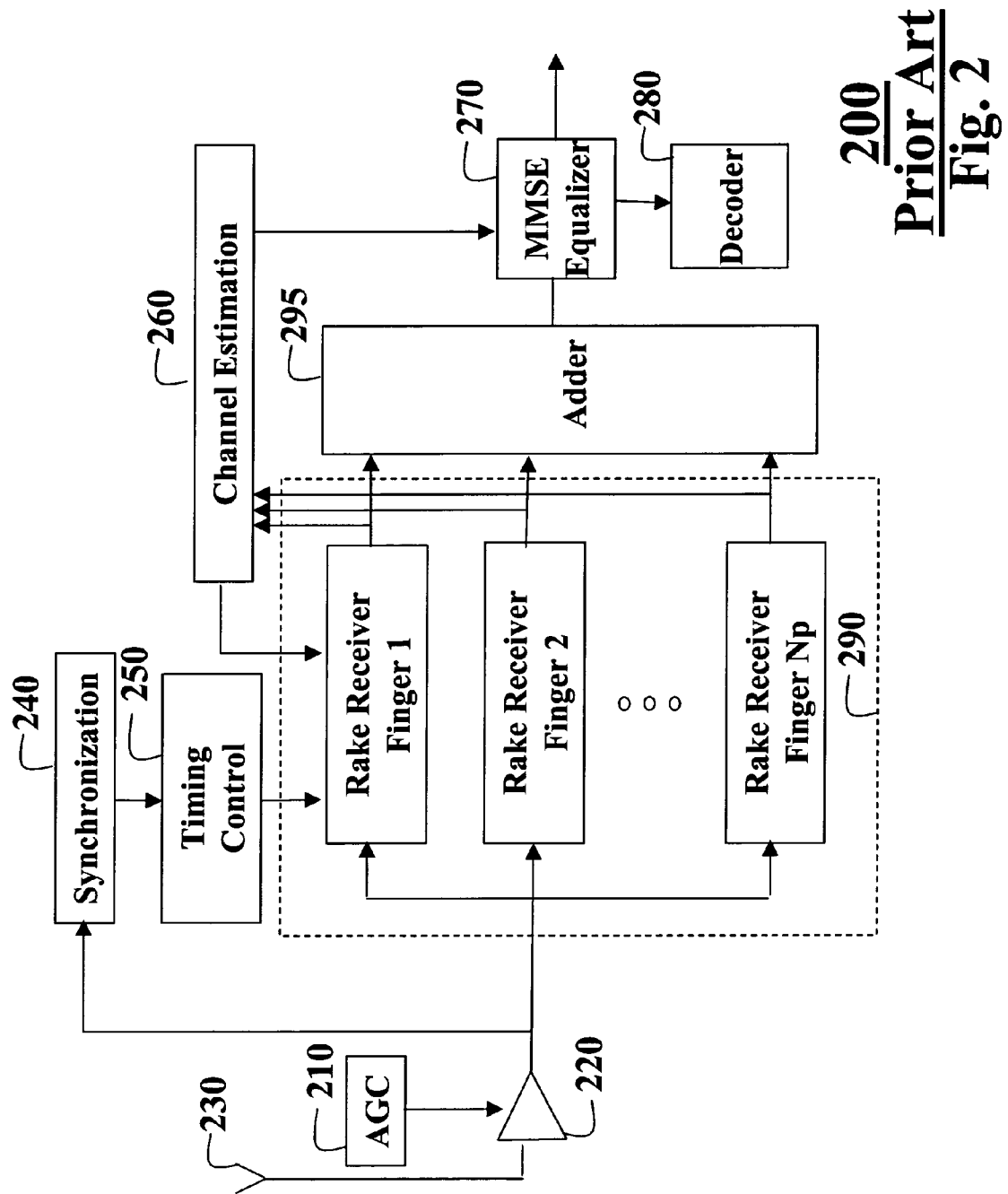
FIG. 2 is a block diagram of a prior art TH-IR receiver.
Figure 3:
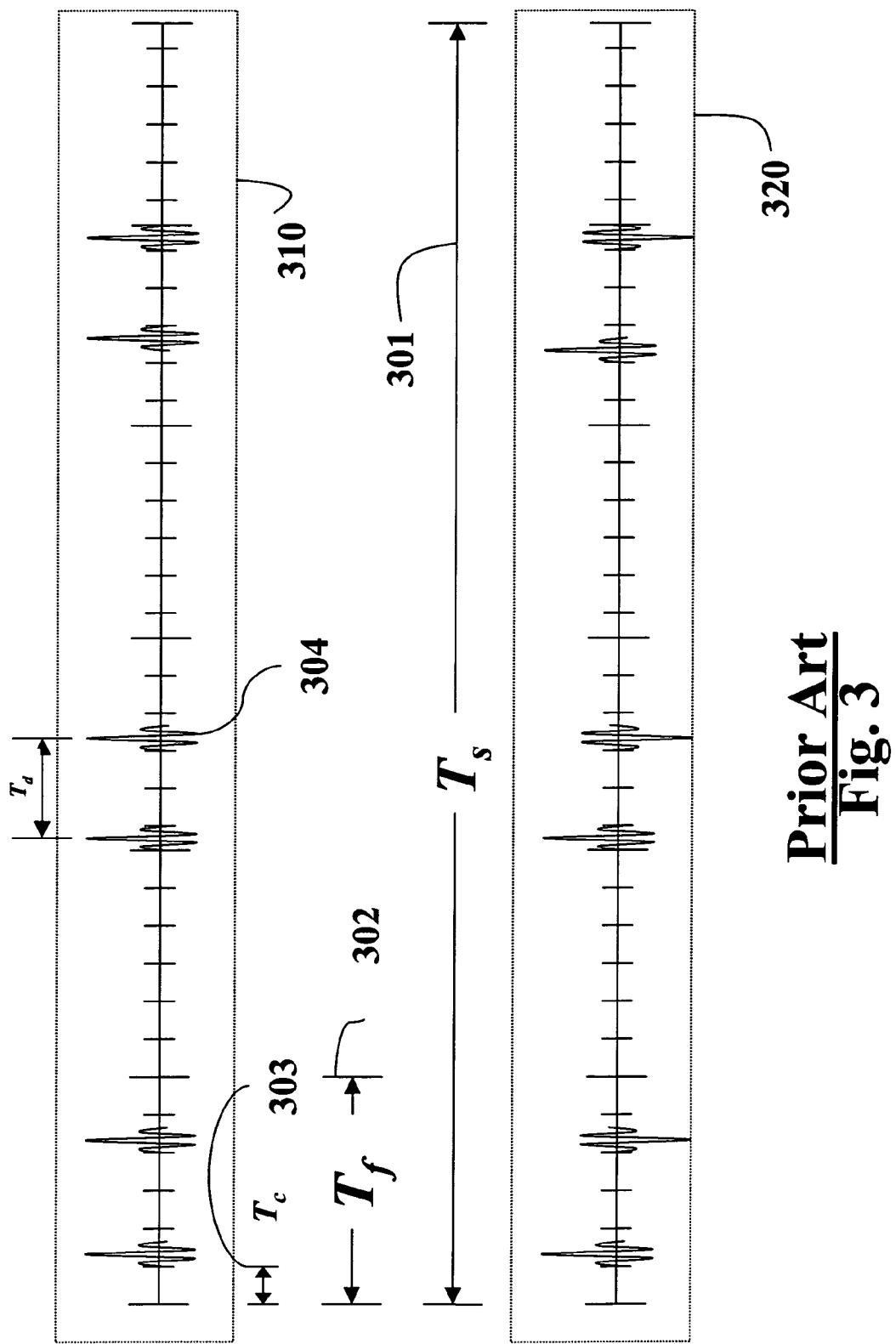
FIG. 3 is a timing diagram of prior art TR-IR modulation.
Figure 4:
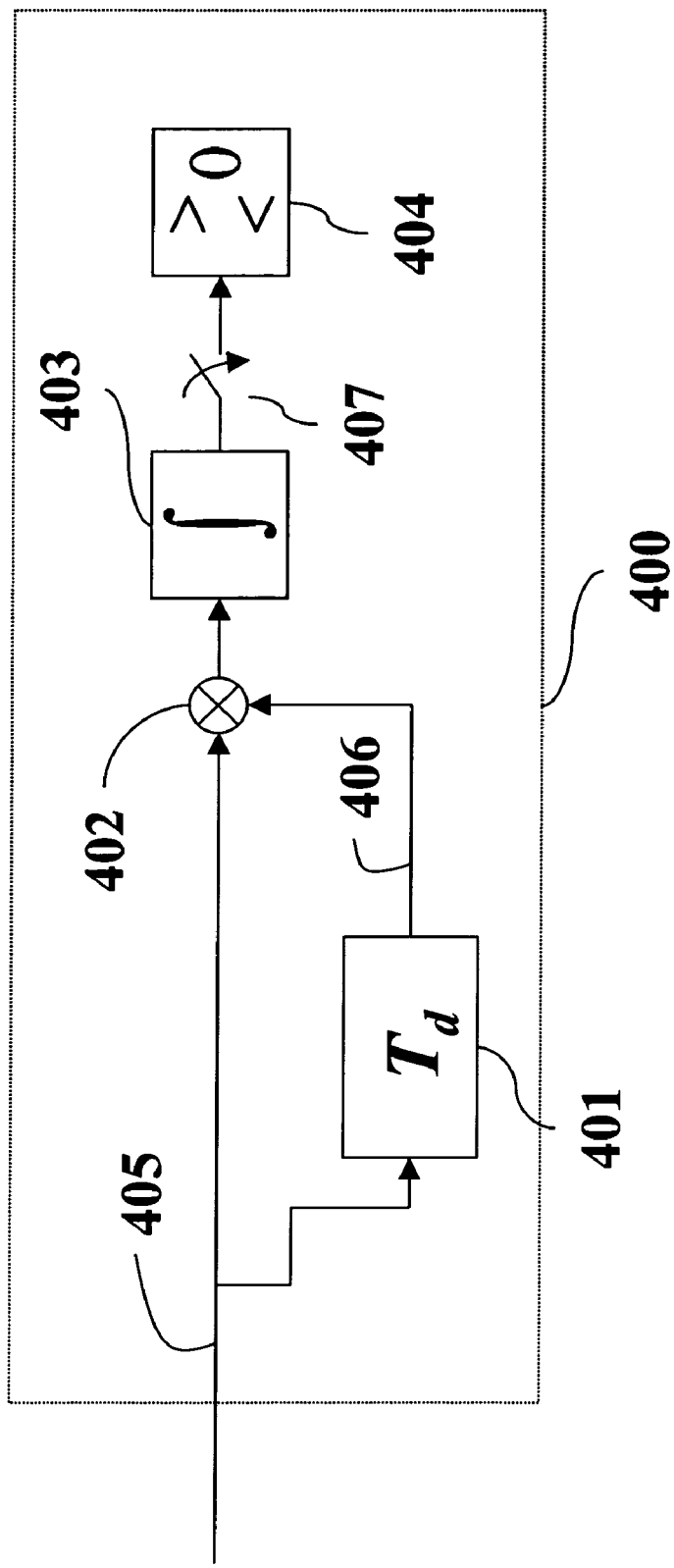
FIG. 4 is a block diagram of a prior art TR-IR receiver.

This waveform, therefore, enables the use of both coherent and differentially coherent receivers, as depicted in FIGS. 4 and 7 respectively, in the same network. The choice of receiver can be based on considerations such as required performance, cost of implementation, or desired transmission distance. Generalization to the case when multiple pairs are used to transmit a symbol is straightforward. In this case each pair is repeated a number of times, and a polarity scrambling code can be used to improve the spectral characteristics of the waveform.

Other Modulation Formats

We can generalize the H-IR scheme described above by including other modulation formats within a symbol. For example, if we partition the symbol period for the current bit into N time intervals, then we can transmit the previously defined waveforms in a selected one of the N intervals. The selected interval can depend on the bit that is to be encoded. In this way, we can include a higher order modulation that encodes bits in the position of the waveform as is done in PPM, J. G. Proakis, "*Digital Communications*," New York, N.Y.: McGraw-Hill, 4th Ed., 2001.

The major advantage of this scheme is that a PPM signal may be received using a noncoherent energy detector. The additional partitioning of the symbol period into multiple intervals allows the transmitter to modulate bits via PPM as well as the H-IR technique described above. Now a receiver may be used that is based on energy collection or a differentially coherent type receiver, as well as a coherent RAKE receiver. Of course the performance of these receivers vary with the more complex architectures achieving better overall bit error rate (BER) performance. The addition of PPM modulation also increases the 'memory' of the modulation format and requires that the trellis describing the signal as seen by the differentially coherent receivers and a coherent receiver is modified as is described below.

In one embodiment, we consider the simplest case with the addition of binary PPM (BPPM). In this case, the symbol interval is partitioned into two intervals a first half (F) and a second half (S) and the current bit of our bit stream is used to select between one of two possible positions. That is a bit '1' is encoded in the first interval and a bit '0' is encoded in the second interval.

Additionally, we assume that the waveform that is transmitted is constructed as described for the H-IR scheme above. Because the current bit is being used to modulate the position of the waveform in this case, the two immediate previous bits are used to modulate the reference pulse and data pulse that constitute the doublets of the symbol waveform. Thus, a simple non-coherent receiver can simply decode the selected transmission interval, i.e., the pulse position. Moreover, we can still use a differentially coherent or coherent RAKE receiver and the higher level trellis encoding/decoding can improve performance.

Further generalizations are possible. We can extend the doublet to a waveform that contains multiple pulses, i.e., two or more pulses. In this manner, a higher order TR scheme can be developed where one of the pulses in the waveform acts as a reference for other pulses. Then, we can achieve a higher order modulation that transmits multiple bits in a single symbol period, i.e., M-ary modulation formats maybe considered within this framework. In this case, the transmitted waveform conveys several bits rather then a single bit. The method consecutive symbols with 'memory'. Thus, a differentially coherent or coherent receiver can use trellis demodulation on the sequence of received symbols.

It is noted that further mapping of previous bits can be employed to modulate the polarity of the reference pulse, and a proper phase relation with the data pulse is preserved. Additionally, it is noted that this scheme can be further generalized by the addition of PPM modulation on the multi-pulse waveform.

Next, we describe the embodiment of the coherent receiver that enables reception of the extended H-IR modulation. Again, we consider the use of a BPPM as described above.

Because BPPM uses the waveform positions to carry information bits, we obtain longer 'memory' length in each frame when we use a differentially coherent or coherent RAKE receiver. In this case, the length of the memory is two bits, i.e., the immediate previous encoded bits before the current bit $b_i$. That is, bits $b_{i-2}$ and $b_{i-1}$ are used to modulate polarity of the reference pulse according to the H-IR scheme above and the bit $b_{i-1}$ determines the phase difference and the polarity of the reference pulse while the current bit $b_i$ determines the waveform position within the symbol duration. Trellis modulation can be then performed as described below.

Figure 11:
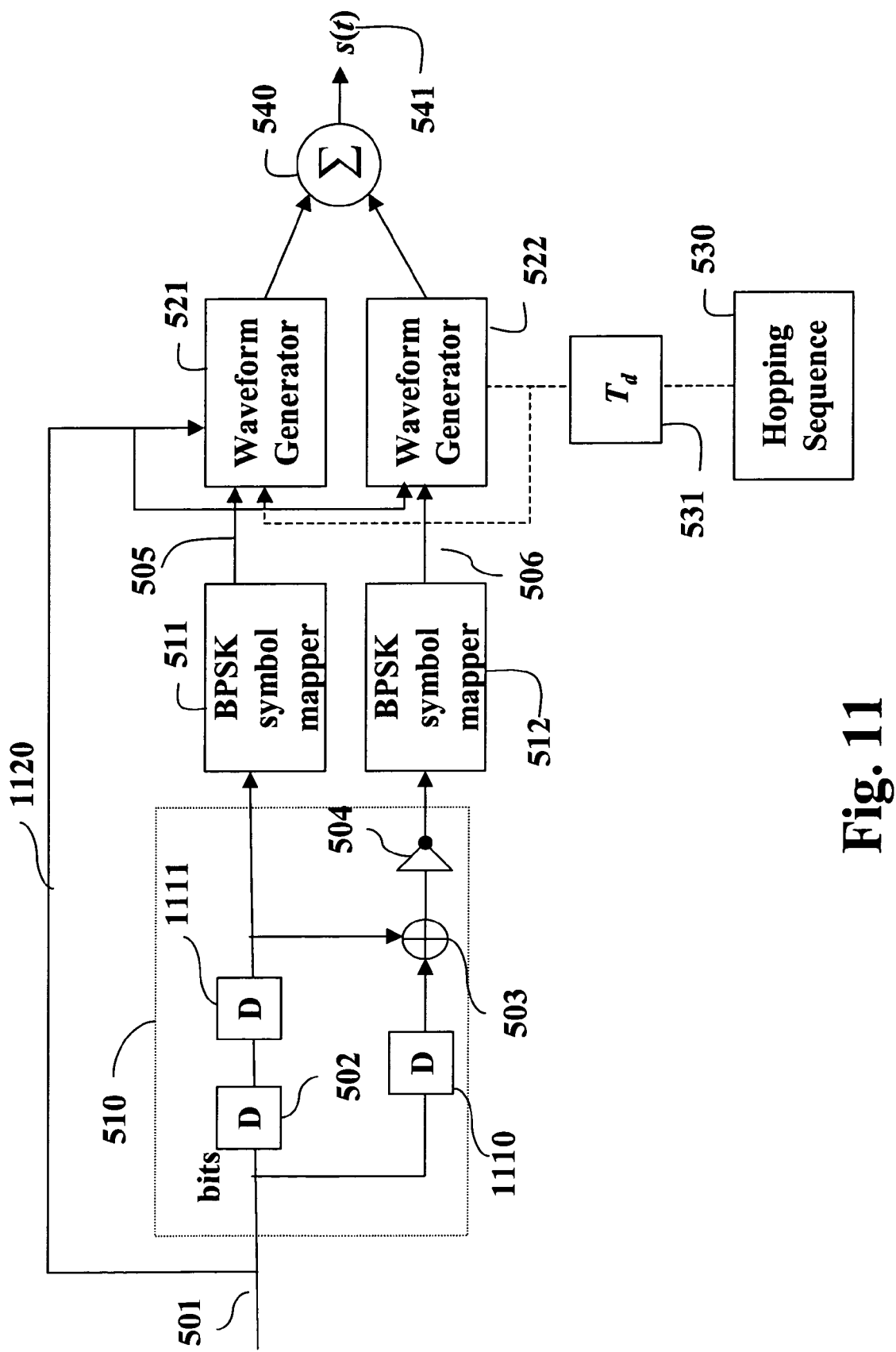
FIG. 11 is a block diagram of a hybrid-IR transmitter according to the invention using other modulation formats.

FIG. 11 shows changes made to the H-IR transmitter 500 of FIG. 5. The pre-processor 510 for input bits is modified to embody the addition of additional modulation formats. Now the two input bits 501 to the adder are the two previous bits because of the addition of two delay units 1110 and 1111. Then, the sum of the two previous bits is inverted 504. The current bit 501 now is encoded by another modulation format 1120, e.g., BPPM, to achieve higher orders. The selections and configuration of encoded bits can be generalized to many different options.

Table B shows eight possible combinations of a current bit and two previous bits, the corresponding values of the reference and data waveforms, and their phase differences or polarities.

TABLE B

| i-2 | i-1 | i | Reference pulse modulation symbol $b_{\lfloor 2j/N_f \rfloor-1}$ | Data pulse modulation symbol $\overline{b_{\lfloor 2j/N_f \rfloor-1}} \oplus b_{\lfloor 2j/N_f \rfloor}$ | Phase difference between reference pulse and data pulse | Doublet position (F: first half, S: second half) |
|---|---|---|---|---|---|---|
| 0 | 0 | 0 | −1 | 1 | 180° | F |
| 0 | 1 | 0 | −1 | −1 | 0° | F |
| 1 | 0 | 0 | 1 | −1 | 180° | F |
| 1 | 1 | 0 | 1 | 1 | 0° | F |
| 0 | 0 | 1 | −1 | 1 | 180° | S |
| 0 | 1 | 1 | −1 | −1 | 0° | S |
| 1 | 0 | 1 | 1 | −1 | 180° | S |
| 1 | 1 | 1 | 1 | 1 | 0° | S |

The signal can be demodulated using a noncoherent BPPM receiver that selects the time interval (first half or second half) with the largest receiver energy. The signal can also be demodulated by a differentially TR or coherent RAKE receiver with improved performance. The gain in performance is based on the fact that information of previously bits, i.e., memory, is encoded in both the reference pulses and the data pulses of the current bit. The additional information can help the TR or RAKE receiver to make decisions on the values of the transmitted bits, see Table A.

As an example of this approach for TR demodulation, we note that the waveform position (first half or second half) represents the current received bit, and phase difference between the reference and data pulses represents the previously received bit.

Figure 9:
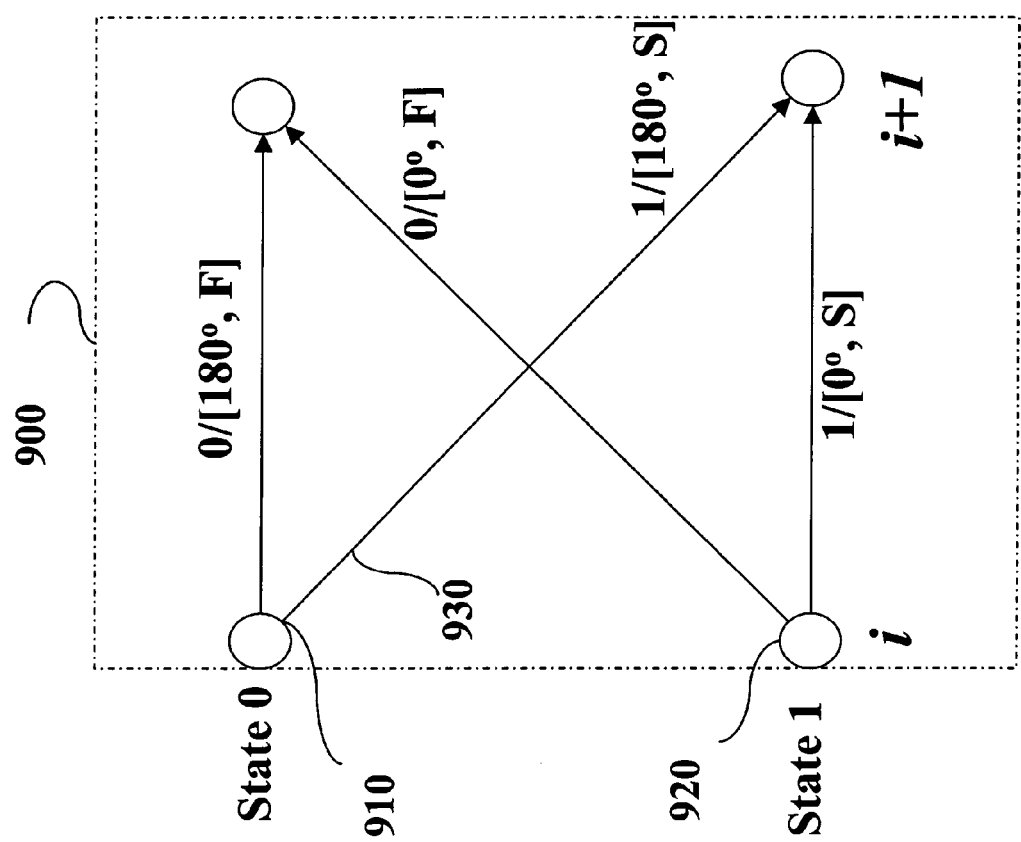
FIG. 9 is a two-state trellis diagram for a differential TR receiver according to the invention.

FIG. 9 shows a two-state trellis 900 decoder that can be used for the decoding. Here, a state '0' 910 maps to a previous bit '0', and a state '1' 920 maps to a previous bit '1'. Branches 930 of the trellis indicate possible state transitions. The branches are labeled with the value of current bit, and a vector representation of the transmitted pair, where the previous bit is demodulated by the phase difference between reference and data pulses, and the current bit is demodulated by the waveform position, and F and S represent first half and second half, respectively.

Figure 12:
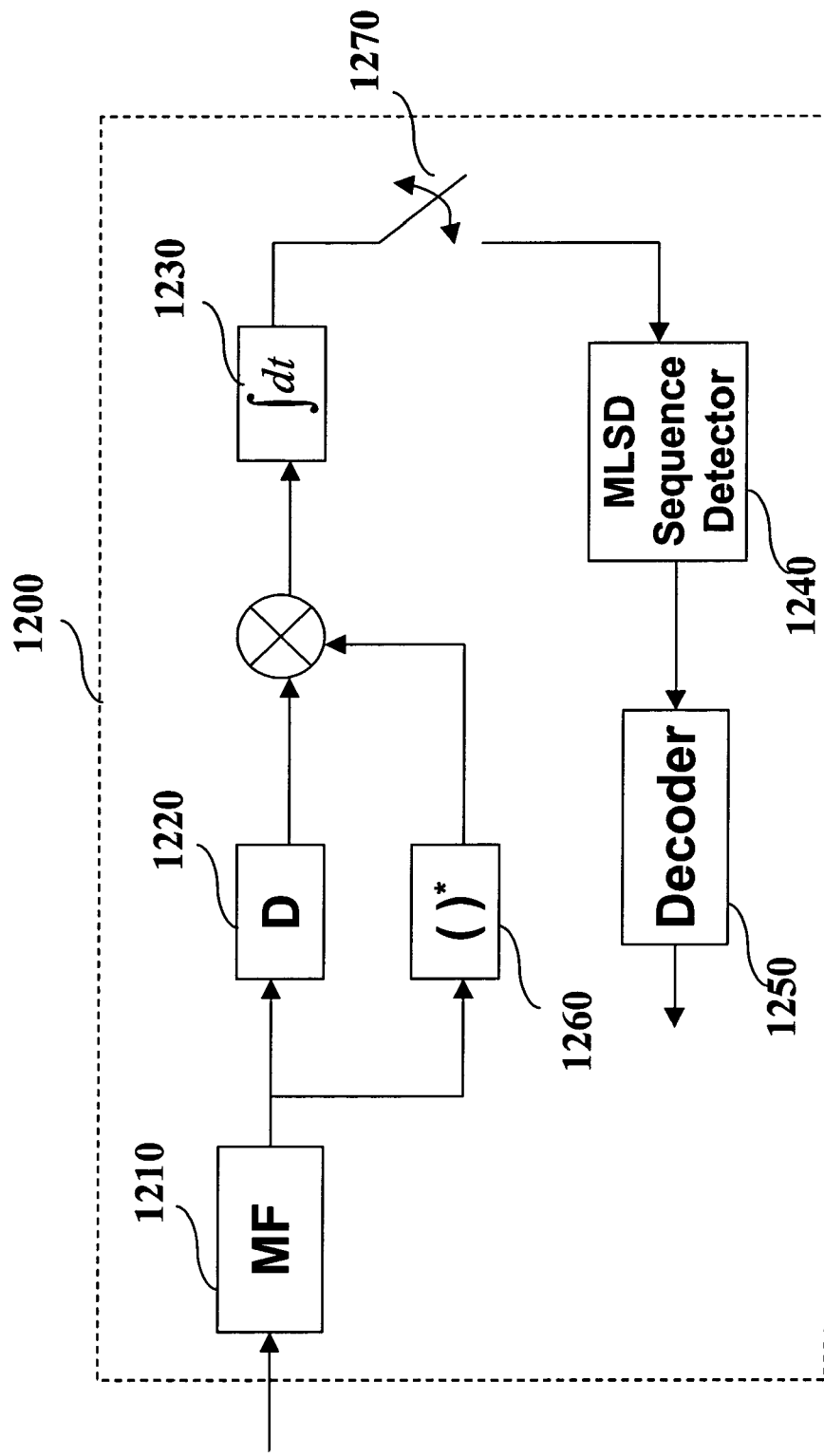
FIG. 12 is block diagram of a hybrid-IR differential receiver according to the invention.

FIG. 12 shows a TR receiver 1200 according to the invention. After pre-filtering the received signal with a matched filter (MF) 1210 matched to the transmitted waveform, the receiver essentially correlates the received signal 1260 with a delayed version 1220. However, different from the prior art, the decision is not made after integration 1230 and dump 1270. Instead, a MLSD detector 1240 observes the output of the correlator at the two possible waveform positions and the relative phase difference between pulses from inputs, and determines a most probable path through the trellis 900 based on those observations. A decoder 1250 follows. Methods that approximate the MSLD detector, such as Viterbi decoder, can also be used.

For coherent RAKE demodulation, we have three information sources in each symbol: reference waveform, data waveform, and doublet position. Correspondingly, we can use the position to demodulate the current bit and use the pulse polarity combination, as described above, to demodulate the previous two bits.

Figure 10:
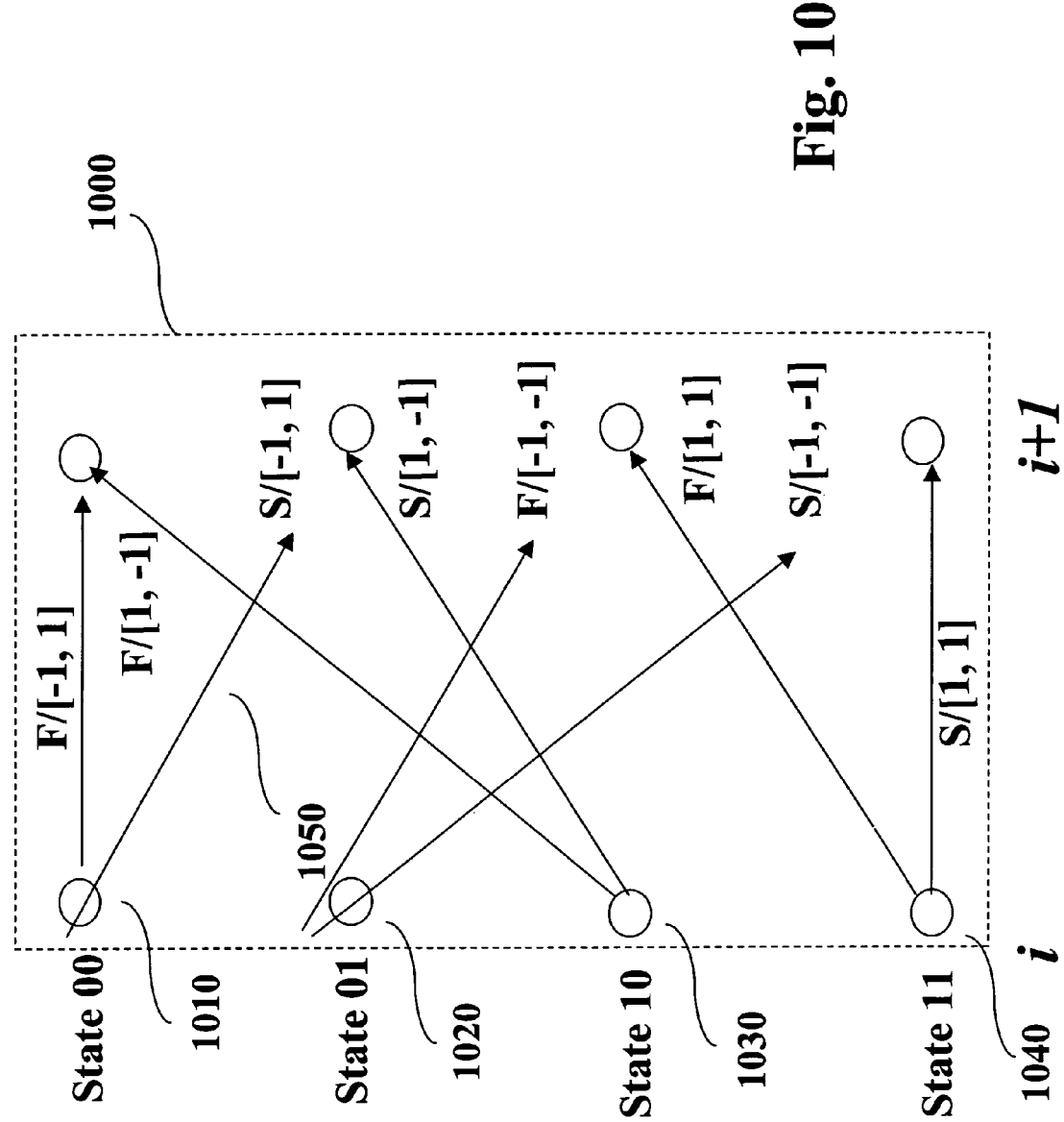
FIG. 10 is a four-state trellis diagram for a coherent RAKE receiver according to the invention.

FIG. 10 shows a four-state trellis 1000 for a coherent RAKE receiver according to the invention. Here, a state '00' 1010 maps to previous bits 00, a state '01' 1020 maps to previous bits '01', a state '10' 1030 maps to previous bits '10', and a state '11' 1040 maps to previous bits '11'. Branches 1050 of the trellis indicate possible transitions. The branches are labeled with the waveform position of current bit, and the vector representation of the transmitted pulse pair. The trellis demodulation can be incorporated into the MLSD detector 720 of the RAKE receiver 700 of FIG. 7. The MLSD detector 720 determines a most probable path through the trellis 1000 for a given sequence of observations. Methods that approximate the MSLD detector, such as Viterbi decoder, can also be used.

M-ary Modulation Formats with Orthogonal Sequences

Another embodiment of the invention uses orthogonal or quasi-orthogonal coding sequences to encode a subsequence of the information bits in both the phase difference of the reference and data pulses and the individual polarities of the pulses that constitute a symbol. In this format, different coding sequences signify different data symbols.

Figure 13:
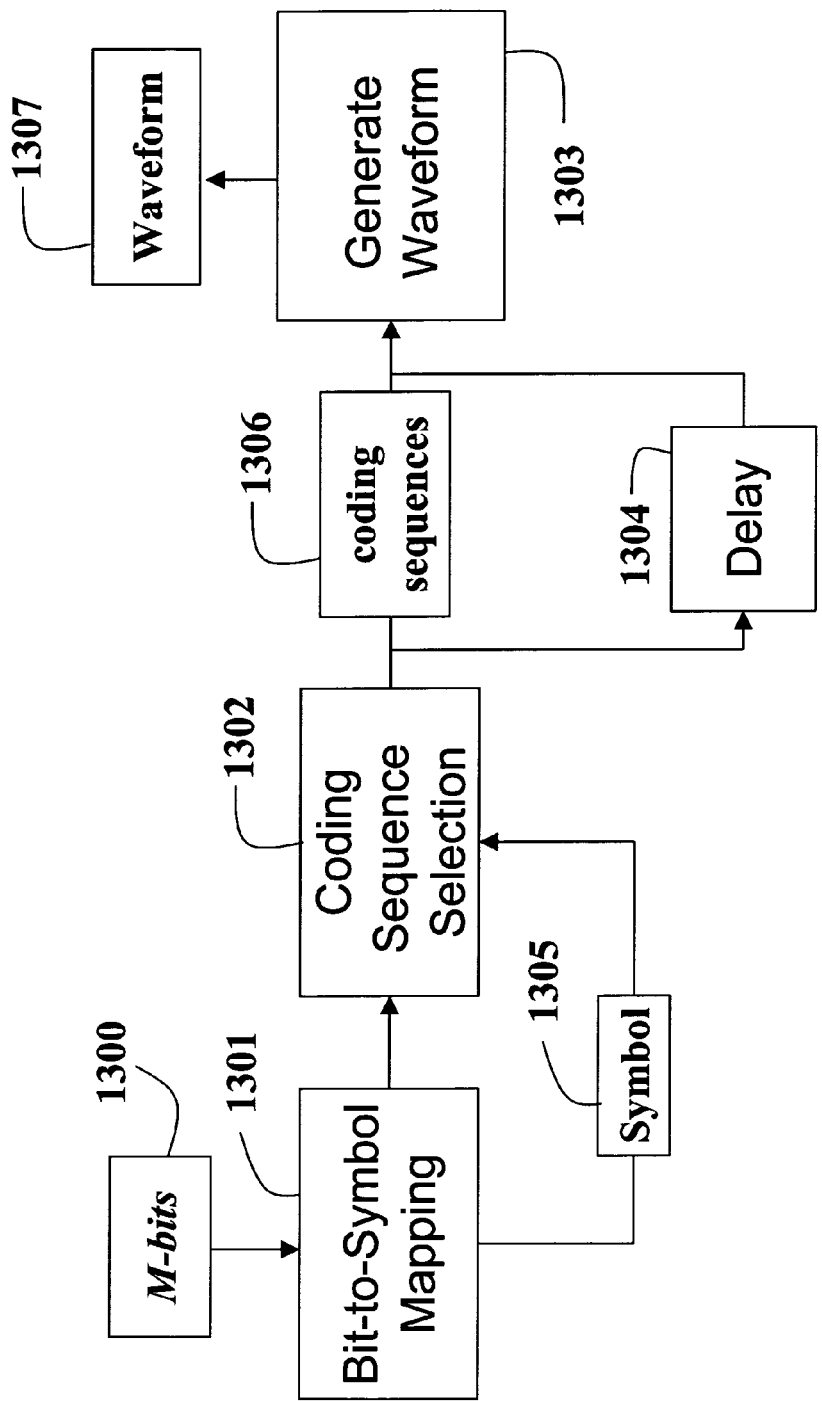
FIG. 13 is a flow diagram of method for modulating subsequences of bits according to the invention.

FIG. 13 show an alternative embodiment of the invention, where subsequences of bits 1300 are modulated, i.e., subsequences of M bits 1300 are mapped 1301 to corresponding symbols 1305, one of $2^M$ symbols. Each symbol is then used to select 1302 one of $2^M$ corresponding coding sequences 1306. The value of M can be any reasonable size. It is preferable that the coding sequences are mutually orthogonal or quasi-orthogonal. Then, the coding sequence is used to generate 1303 the waveform 1307. The polarities and relative phases of the reference pulses and data pulses of the waveform are determined according to the coding sequence 1306.

In any case, the transmitted waveforms include a reference pulse and one or more data pulses that are separated by a fixed delay. The delay 1304 here is optional and is NOT the same as the delay between the reference and data pulses of the waveform. In some cases, we use the coding sequence directly to encode data. In other cases, the delay 1304 can be equal to the length of the coding sequence so that the current sequence and the previous sequence generate the reference and data pulses.

Alternatively, the delay is some value less then the length of the entire coding sequence. In this manner, some part or equivalently subsequence of the current sequence is used to generate the references pulses, while a previous subsequence of the current sequence generates the data pulses.

We process an input symbol as follows. First, we map a subsequence of bits of length M bits from our input bit stream to a symbol to be modulated. The symbol is used to select one of a set of coding sequences. The coding sequences can be orthogonal or quasi-orthogonal. The size of the set of coding sequences is at least $2^M$. This size ensures that all transmitted waveforms are orthogonal or quasi-orthogonal.

For example, if a subsequence has a length of 4, then the set of coding sequences has 16 elements. The binary value of the subsequence is used as an index to the set. For example, if the subsequence is '0011', then the fourth coding sequence of the set is selected.

To simplify this description, we first consider the case of binary sequences. One example is given in Table C.

TABLE C

| Symbol | Cyclic shift to right by n chips, n= | 32 Chip value |
|---|---|---|
| 0000 | 0  | -1 1 1 1 -1 -1 -1 1 1 -1 1 1 1 -1 1 -1 1 1 -1 -1 -1 -1 1 1 -1 -1 1 1 -1 1 1 1 -1 -1 1 1 1 |
| 0001 | 2  | -1 1 1 1 1 1 -1 -1 -1 1 1 -1 1 1 1 -1 1 -1 1 -1 -1 -1 -1 1 1 -1 -1 1 1 -1 1 1 1 -1 -1 1 -1 |
| 0011 | 4  | -1 -1 -1 1 1 1 1 1 1 -1 -1 -1 1 1 -1 1 1 1 -1 1 -1 1 -1 -1 -1 -1 1 1 -1 -1 1 1 -1 1 1 1 |
| 0010 | 6  | -1 1 1 -1 -1 1 1 1 1 1 1 -1 -1 -1 1 1 1 -1 1 1 1 -1 1 -1 1 -1 -1 -1 -1 1 1 -1 -1 1 1 -1 |
| 0110 | 8  | -1 1 -1 1 1 1 -1 -1 1 1 1 1 1 1 -1 -1 -1 1 1 1 -1 1 1 1 -1 1 1 -1 1 -1 -1 -1 -1 1 1 -1 |
| 0111 | 1-1 | -1 -1 -1 1 -1 1 1 1 -1 -1 1 1 1 1 1 1 -1 -1 -1 1 1 1 -1 1 1 1 -1 1 1 -1 1 -1 -1 -1 -1 1 1 |
| 0101 | 12 | -1 -1 1 1 -1 -1 1 1 -1 1 1 1 -1 -1 1 1 1 1 1 1 -1 -1 -1 1 1 1 -1 1 1 1 -1 1 1 -1 1 -1 -1 -1 |
| 0100 | 14 | -1 -1 -1 -1 1 1 -1 -1 1 1 -1 1 1 1 -1 -1 1 1 1 1 1 1 -1 -1 -1 1 1 1 -1 1 1 1 -1 1 1 -1 1 -1 |
| 1100 | 15 | -1 -1 -1 -1 -1 1 1 -1 -1 1 1 -1 1 1 1 -1 -1 1 1 1 1 1 1 -1 -1 -1 1 1 1 -1 1 1 1 -1 1 1 -1 1 |
| 1101 | 17 | -1 -1 1 1 -1 -1 -1 -1 -1 1 -1 -1 1 1 -1 -1 1 1 1 -1 -1 1 1 1 1 1 1 -1 -1 -1 1 1 1 -1 1 1 1 |
| 1111 | 19 | -1 -1 1 1 -1 1 1 -1 -1 -1 -1 -1 1 1 -1 -1 1 1 -1 -1 1 1 1 -1 -1 1 1 1 1 1 1 -1 -1 -1 1 1 1 |
| 1110 | 21 | -1 1 1 1 -1 1 1 -1 1 1 -1 1 1 -1 -1 -1 -1 -1 1 1 -1 -1 1 1 -1 -1 1 1 1 -1 -1 1 1 1 1 1 1 -1 -1 -1 1 1 1 |
| 1010 | 23 | -1 -1 1 1 1 1 -1 1 1 -1 1 1 -1 1 1 -1 -1 -1 -1 -1 1 1 -1 -1 1 1 -1 -1 1 1 1 -1 -1 1 1 1 1 1 1 -1 -1 -1 1 1 1 |
| 1011 | 25 | -1 1 1 1 -1 1 1 1 1 -1 1 1 -1 1 1 -1 -1 -1 -1 -1 1 1 -1 -1 1 1 -1 -1 1 1 1 -1 -1 1 1 1 1 1 1 -1 -1 -1 |
| 1001 | 27 | -1 -1 -1 1 1 1 -1 1 1 1 1 -1 1 1 -1 1 1 -1 -1 -1 -1 -1 1 1 -1 -1 1 1 -1 -1 1 1 1 -1 -1 1 1 1 1 1 1 -1 |
| 1000 | 29 | -1 1 -1 -1 -1 1 1 1 -1 1 1 1 1 -1 1 1 -1 1 1 -1 -1 -1 -1 -1 1 1 -1 -1 1 1 -1 -1 1 1 1 -1 -1 1 1 1 1 1 1 |

The '+' and '−' symbols indicate that at a current position a value of the coding sequence is either '+1' or '−1'. To construct the transmitted waveform from the coding sequence, we consider the structure mentioned above, specifically that the symbol duration is divided into 'frames' and 'chips' within each frame. We transmit two or more short pulses to achieve the required bandwidth.

The pulses in each frame are separated by a fixed time delay $T_d$. The two pulses are referred to as the reference pulse and the data pulse, as described above. The waveform now encodes the selected one of the $2^M$ coding sequences by using the value of each sequence value to define both the polarity of the reference pulse, and the phase relationship between the reference and data pulses.

For example, the polarity of the first pulse is given by the sequence representing the symbol, see Table C, while the phase difference between the reference and the data pulse is determined by the information bits of the currently transmitted symbol.

Because the number of bits encoded in a symbol is greater than one, it is not possible to encode the information as 0 and 180 degrees phase shifts between the reference and data pulse of each frame. Rather, we have the following possibilities:

(i) Transmit M+1 bits in each frame, so that the M bits can be encoded in the phase differences between the multiple pulses. Specifically, in this case, each frame now includes of M+1 pulses. We refer to the first pulse as the reference pulse. The polarity of this pulse is determined from the specific codeword being transmitted. The following M pulses are considered data pulses and the relative phase between these pulses encodes the subsequence of bits that makes up the current symbol. So we essentially generate a symbol that has $N_f$ frames where $N_f$ is the length of the codeword, and each frame has one reference pulse and multiple data pulses. The sequence of phase relationships corresponds to the subsequence of bits that determine the M-ary symbol. This sequence of phase relationships is then repeated in each of the $N_f$ frames.

(ii) Group the frames into M groups, so that the phase difference between reference pulse and data pulse within each group is determined by the $m^{th}$ bit of the current symbol, for m=1, . . . , M. Specifically, we consider the group of frames as encoding the information of one bit and simultaneously the whole set of frames encoding one of the M symbols. In this case, the phases of the data pulses in each subgroup of frames are determined by the codewords, but the relative phase between the data pulse and reference pulse contains the encoding of the current bit of the symbol. For example with M=4 as above, we can partition the transmitted waveform into 4 subgroups each containing 8 frames. In each of the groups, the data pulses follow the pattern in the codeword, while the reference pulse depends on the current bit. That is, if the current bit is a zero, then the 8 reference pulses in the current group all have a 180 degree phase shift from the codeword.

For cases (i) and (ii), it is also possible to select the polarity of the reference pulse according to the previous symbol, while the phase difference between reference and data pulses is selected according to the current symbol, as described above.

We also have the following possibilities:

(iii) The phase difference in each frame is identical to the value of the coding sequence for this frame. For example, a '+1' is transmitted as two positive pulses, while a '−1' is as a negative pulse followed by a positive pulse. Thus, the output of the TR detector is identical to the transmitted sequence, and optimum detection can be performed. However, this scheme has a decreased performance when detected coherently. Because the second pulse is always positive, the second pulse cannot be used gainfully for detection.

(iv) The phase of the reference pulse is determined by the previous symbol of the coding sequence, while the phase difference between the reference pulse and the data pulse is determined by the current symbol of the coding sequence. As a consequence, the phase difference can be different from frame to frame. In this case, the delay in FIG. 13 is equal to an entire codeword length. The phase of the reference pulses in each frame are set according to the previously selected codeword, and the relative phases of the data pulses are determined as in FIG. 5, where a combination of the current codeword symbol and the previous codeword symbol is used to set this phase.

Alternatively, ternary coding sequences can be used, i.e., M=4, and the set has $2^4$ (16) coding sequences. Table D shows one example of a set of orthogonal ternary sequences that can be used. This is just one particular example of many possible sequences. Larger alphabet sequences can also be constructed. Note, the elements of the set define 'random' polarities and the presence or absence of the waveform in the corresponding frame, i.e. when the code symbol is a '0' no waveform is transmitted. It should be understood that for larger alphabets, the code can define amplitudes, positions, and the like.

TABLE D2

| Symbol | Cyclic shift to right by n chips, n= | 32-Chip value |
|---|---|---|
| 0000 | 0  | 0 + − − 0 0 0 + − 0 + + + 0 + 0 − 0 0 0 0 + 0 0 − 0 − + 0 0 − − |
| 0001 | 2  | 0 − − + − − 0 0 0 + − 0 + + + 0 + 0 − 0 0 0 0 + 0 0 − 0 − + 0 0 |
| 0011 | 4  | 0 0 0 − − + − − 0 0 0 + − 0 + + + 0 + 0 − 0 0 0 0 + 0 0 − 0 − + |
| 0010 | 6  | 0 − + 0 0 − − + − − 0 0 0 + − 0 + + + 0 + 0 − 0 0 0 0 + 0 0 − 0 |
| 0110 | 8  | 0 − 0 − + 0 0 − − + − − 0 0 0 + − 0 + + + 0 + 0 − 0 0 0 0 + 0 0 |
| 0111 | 10 | 0 0 0 − 0 − + 0 0 − − + − − 0 0 0 + − 0 + + + 0 + 0 − 0 0 0 0 + |
| 0101 | 12 | 0 0 + 0 0 − 0 − + 0 0 − − + − − 0 0 0 + − 0 + + + 0 + 0 − 0 0 0 |
| 0100 | 14 | 0 0 0 0 + 0 0 − 0 − + 0 0 − − + − − 0 0 0 + − 0 + + + 0 + 0 − 0 |
| 1100 | 15 | 0 0 0 0 0 + 0 0 − 0 − + 0 0 − − + − − 0 0 0 + − 0 + + + 0 + 0 − |
| 1101 | 17 | 0 0 − 0 0 0 0 + 0 0 − 0 − + 0 0 − − + − − 0 0 0 + − 0 + + + 0 + |
| 1111 | 19 | 0 0 + 0 − 0 0 0 0 + 0 0 − 0 − + 0 0 − − + − − 0 0 0 + − 0 + + + |
| 1110 | 21 | 0 + + 0 + 0 − 0 0 0 0 + 0 0 − 0 − + 0 0 − − + − − 0 0 0 + − 0 + |
| 1010 | 23 | 0 0 + + + 0 + 0 − 0 0 0 0 + 0 0 − 0 − + 0 0 − − + − − 0 0 0 + − |
| 1011 | 25 | 0 + − 0 + + + 0 + 0 − 0 0 0 0 + 0 0 − 0 − + 0 0 − − + − − 0 0 0 |
| 1001 | 27 | 0 0 0 + − 0 + + + 0 + 0 − 0 0 0 0 + 0 0 − 0 − + 0 0 − − + − − 0 |
| 1000 | 29 | 0 − 0 0 0 + − 0 + + + 0 + 0 − 0 0 0 0 + 0 0 − 0 − + 0 0 − − + − |

In this example, the length M of the sequence is four, and the total number of sequences is sixteen. The '+' and '−' symbols indicate that at the current position of the coding sequence is either '+1' or '−1', and the symbol '0' a zero.

In this example, coding sequences are constructed cyclical shifts that are orthogonal. However, any coding sequence or codeword that is orthogonal can be used.

Figure 14:
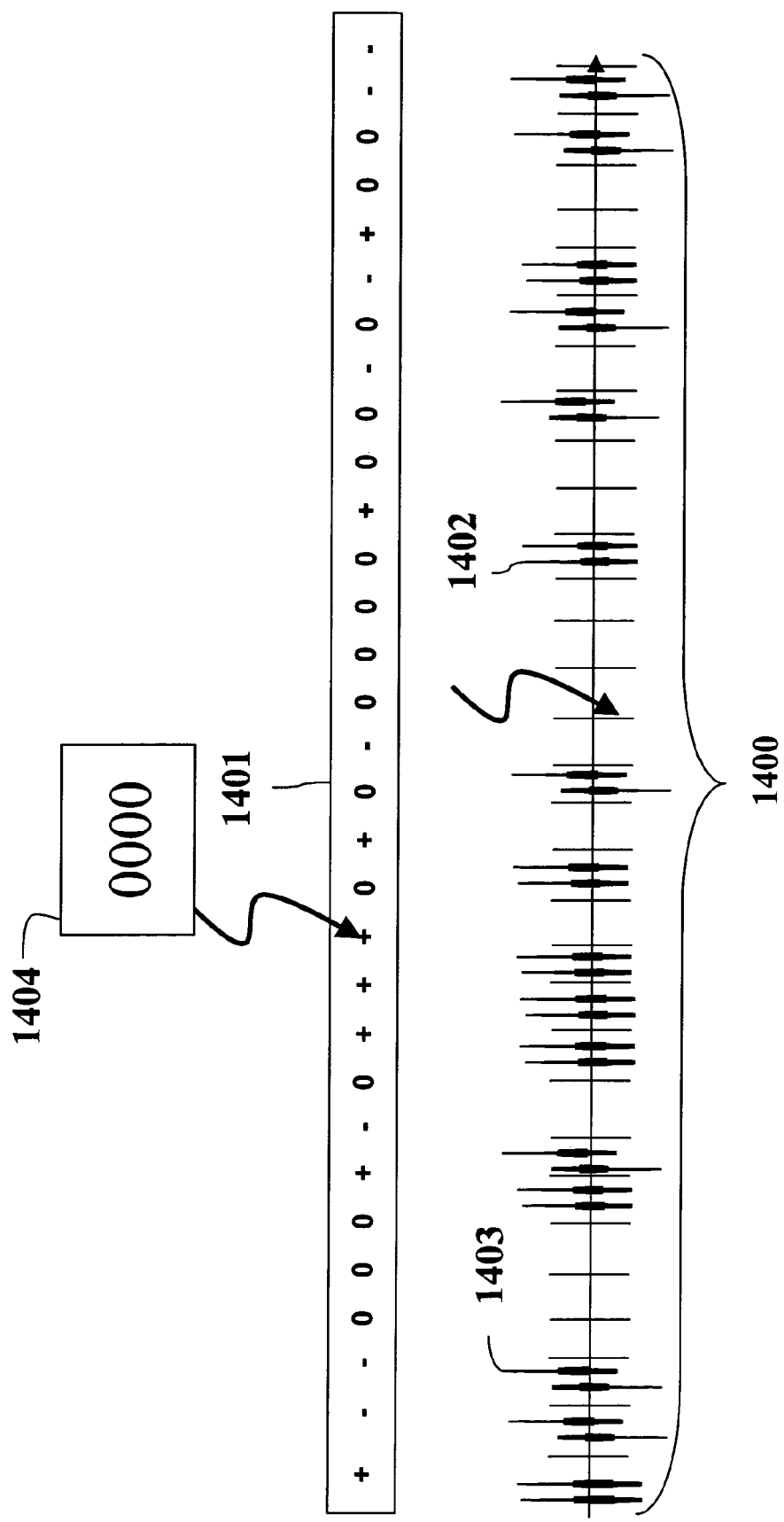
FIG. 14 is an example encoding according to the invention.

FIG. 14 shows an example encoding according to the first orthogonal sequence from Table C. This example shows the transmitted symbol '0000' 1404, the corresponding ternary coding sequence or 'symbol' 1401, and the transmitted waveform 1400. When the coding sequence bit is a '+', a pair of pulses 1402 with positive polarity are transmitted. When the sequence bit is a '−', a pair of negative pulses is transmitted. However, in this case, the reference pulse has a negative polarity, the data pulse 1403 has positive polarity.

In the case of ternary coding sequences, a straightforward encoding according to scheme (iv) above is not possible. If a '0' is transmitted, then no additional information can be encoded in that specific chip. For this reason, one of the other schemes described above is applied.

With these modulation schemes, we can use any of the receivers described above, i.e., coherent, differentially coherent, or non coherent, to recover the transmitted signal. For the differentially coherent receiver a simple delay and correlate receiver can be used as shown in FIG. 4.

Additionally, a coherent rake receiver as shown in FIG. 5 can be used to achieve optimum performance. We note that the reference pulse carries information about the current orthogonal sequence symbol so that the coherent receiver can make use of reference pulse to estimate the received sequence.

Effect of the Invention

The modulation format according to the invention can be demodulated by coherent, RAKE TH-IR, a differentially coherent TR-IR receiver, as well as a noncoherent receiver. The RAKE TH-IR receiver will not suffer a 3 dB loss due to the transmission of the reference pulse as this pulse now contains information about the current being transmitted. Additionally, this allows another method to achieve higher order modulation formats that transmit multiple bits per modulation symbol.

Although the example signals are for a UWB system, it should be understood that the invention can also be used for narrow band width wireless communication systems, and UVVB systems that use waveforms other than pulses, CDMA, FSK, and PSK modulation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for M-ary modulating a sequence of bits in a wireless communications network, comprising the steps of:
   mapping subsequences of M bits of the sequence of bits to corresponding symbols to be M-ary modulated;
   selecting, for each current symbol, one of a set of coding sequences according to the symbol;
   generating, for each symbol, a plurality of frames, in which a number of frames in the plurality of frames is equal to a number of bits in the selected coding sequence;
   generating, for each bit in each frame, a reference waveform, in which a phase of the reference waveform depends on the bit; and
   generating, for each bit in each frame, a data waveform, in which a difference in phase between the reference waveform and the data waveform depends on the bit and a previous bit of the coding sequence.

2. The method of claim 1, in which the coding sequences are orthogonal.

3. The method of claim 1, in which the coding sequences are quasi-orthogonal.

4. The method of claim 1, in which the sequence is ternary, and the set includes sixteen coding sequences.

5. The method of claim 1, in which the reference waveform is followed by a plurality of data waveforms.

6. The method of claim 5, in which the reference waveform of a first bit of the coding sequence serves as a reference waveform for all bits in the coding sequence.

7. The method of claim 6, in which a polarity of each data waveform in each frame is determined according to the selected coding sequence.

8. The method if claim 7, in which the polarity of the reference waveform is determined by one of the bits in the subsequence of bits that constitutes the symbol and a polarity of a codeword sequence.

9. The method of claim 8, in which one waveform in each frame is a reference waveform having a polarity determined by the codeword sequence.

10. The method of claim 9, in which relative polarities for remaining data waveforms of the frame are determined according to the subsequence of bits.

11. The method of claim 1, in which the reference waveforms and the data waveforms for all of the bits in the coding sequence constitute a frame, and in which the phase of the reference waveform is determined by a previous symbol of the coding sequence, while the phase difference between the reference waveform and the data waveform is determined by the current symbol.

12. A method for M-ary modulating a sequence of bits in a wireless communications network, comprising the steps of:
mapping subsequences of M bits of the sequence of bits to corresponding symbols to be M-ary modulated;
selecting, for each symbol, one of a set of coding sequences according to the symbol;
generating, for a first bit in the coding sequence, a reference waveform, in which a phase of the reference waveform depends on the bit; and
generating, for each bit in the coding sequence, a data waveform of a waveform pair for the bit, in which a difference in phase between the reference waveform and the data waveform depends on the bit and a previous bit of the coding sequence.

13. A method for M-ary modulating a sequence of bits in a wireless communications network, comprising the steps of:
mapping subsequences of M bits of the sequence of bits to corresponding symbols to be M-ary modulated;
selecting, for each symbol, one of a set of coding sequences according to the symbol;
generating, for each bit in the coding sequence, a reference waveform of a waveform pair for the bit, in which a phase of the reference waveform depends on the bit; and
generating, for each bit in the coding sequence, a data waveform of the waveform pair for the bit, in which a difference in phase between the reference waveform and the data waveform in the waveform pair depends on an $m^{th}$ bit of the coding sequence.

14. The method of claim 12 or 13, in which a polarity of the reference waveform is selected according to a previous symbol, and the phase difference between reference waveform and the data waveform is selected according to the current symbol.

* * * * *